(12) United States Patent
Sako et al.

(10) Patent No.: US 7,047,003 B2
(45) Date of Patent: May 16, 2006

(54) MOBILE COMMUNICATION SYSTEM, MOBILE UNIT AND NETWORK HOST PROCESSOR

(75) Inventors: Takumi Sako, Tokyo (JP); Yoshihiro Yamabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/515,627

(22) PCT Filed: Jun. 27, 2003

(86) PCT No.: PCT/JP03/08246

§ 371 (c)(1),
(2), (4) Date: Dec. 6, 2004

(87) PCT Pub. No.: WO2005/002268

PCT Pub. Date: Jan. 6, 2005

(65) Prior Publication Data

US 2005/0186957 A1    Aug. 25, 2005

(51) Int. Cl.
*H04Q 7/20* (2006.01)

(52) U.S. Cl. .................. 455/423; 455/436; 370/331

(58) Field of Classification Search ............... 455/423, 455/436, 442, 432.1, 450, 451; 370/331, 370/329, 322, 341, 348
See application file for complete search history.

(56) References Cited

U.S. PATENT DOCUMENTS

| | | | | |
|---|---|---|---|---|
| 5,267,261 | A  * | 11/1993 | Blakeney et al. | 370/332 |
| 6,834,189 | B1 * | 12/2004 | Forde | 455/436 |
| 6,931,257 | B1 * | 8/2005  | Shahidi et al. | 455/522 |
| 6,941,141 | B1 * | 9/2005  | Park et al. | 455/436 |

FOREIGN PATENT DOCUMENTS

| | | |
|---|---|---|
| JP | 8-172390   | 7/1996 |
| JP | 10-336723  | 12/1998 |
| JP | 2002-112311| 4/2002 |
| JP | 2002-515714| 5/2002 |

* cited by examiner

*Primary Examiner*—Charles N. Appiah
*Assistant Examiner*—Nghi H. Ly
(74) *Attorney, Agent, or Firm*—Oblon, Spivak, McClelland, Maier & Neustadt, P.C.

(57) ABSTRACT

A mobile unit that provides an improved handover function in a mobile communication system having a soft handover function defined by 3GPP (3rd Generation Partnership Project). The mobile unit sets a flutter-preventing threshold relative to an event 1C at a first value when the communication level of a monitor set cell does not fall within an emergency range, and at a second value lower than the first value when the communication level of the monitor set cell falls within the emergency range.

6 Claims, 11 Drawing Sheets

F I G. 5
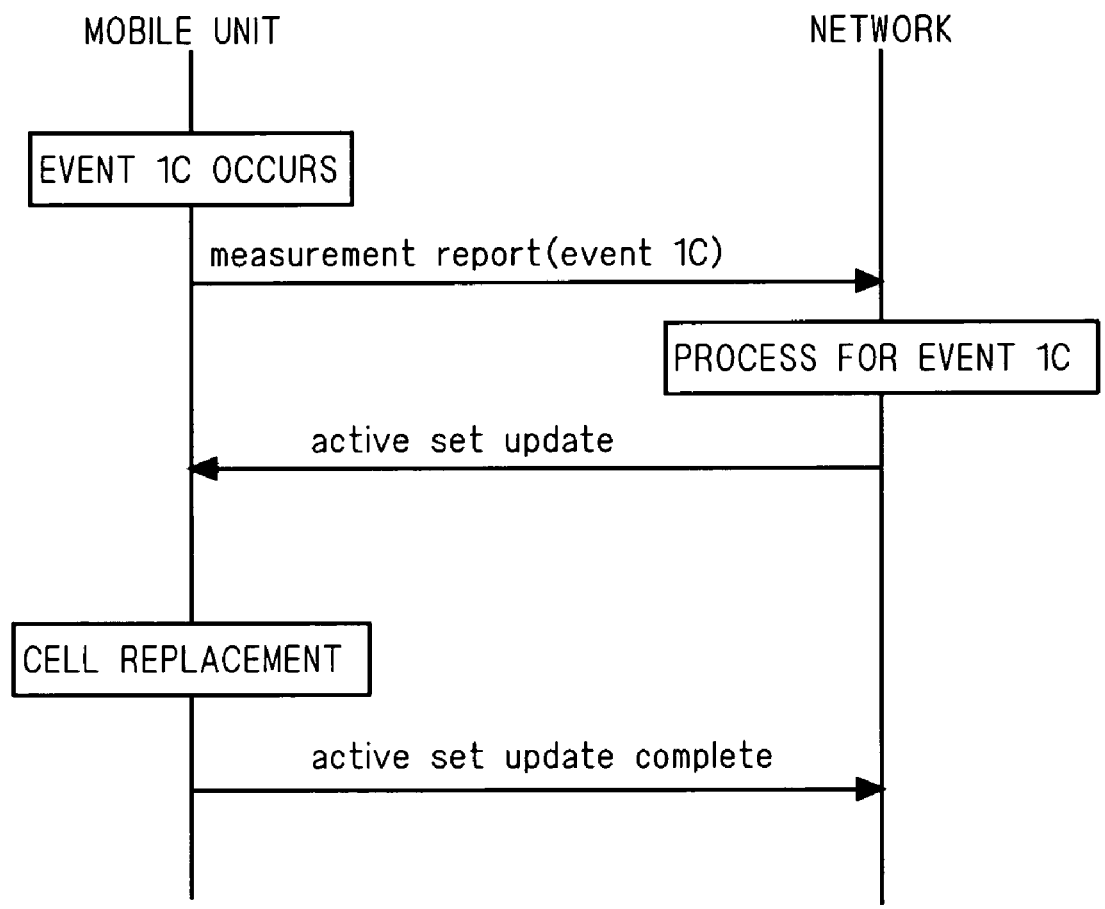

MOBILE COMMUNICATION SYSTEM, MOBILE UNIT AND NETWORK HOST PROCESSOR

TECHNICAL FIELD

The present invention relates to a mobile communication system, and more particularly, to a mobile communication system having a soft handover function defined by 3GPP (3rd Generation Partnership Project). The present invention also relates to a mobile unit and a network host processor constituting the mobile communication system.

BACKGROUND ART

A mobile communication system is provided with a handover function such that a call is not interrupted even when a user is talking while moving. The third generation mobile telephone system is called W-CDMA (Wideband Code Division Multiple Access) system. With this system, a mobile unit is capable of communicating with a plurality of base stations (called "cells") simultaneously if the base stations use the same frequency. Accordingly, in the case of a call while moving, the mobile unit maintains communication with a first base station with which the mobile unit is currently communicating while starting communicating with a second base station, and thereafter, communication with the first base station is interrupted in the case where the communication level with respect to the first base station is lowered. Such handover is called soft handover (SHO) or diversity handover (DHO). The state in which a mobile unit is communicating with a plurality of base stations is called a soft handover state or diversity handover state.

The technique related to a conventional mobile communication system having the handover function is disclosed in the following document 1.

Patent Document 1

Japanese Patent Application Laid-Open No. 2002-112311

However, the conventional mobile communication system has a problem in that its handover function is insufficient.

DISCLOSURE OF INVENTION

It is an object of the present invention to solve the above problem and to achieve an improved handover function.

According to a mobile communication system of the present invention, the mobile communication system includes a network host processor, a plurality of cells and a mobile unit, wherein the plurality of cells include a monitor set cell and a plurality of active set cells, the mobile unit includes a controller for reporting, to the network host processor through the plurality of active set cells, the occurrence of an event related to cell replacement when the communication level of the monitor set cell becomes equal to or higher than the sum total of the communication level of the worst active set cell having the lowest communication level among the plurality of active set cells and a predetermined threshold previously determined, and the controller has: first setting means for defining a predetermined range with respect to the communication level of the best active set cell having the highest communication level among the plurality of active set cells; and second setting means for setting the predetermined threshold at a first value when the communication level of the monitor set cell does not fall within the predetermined range, and at a second value lower than the first value when the communication level of the monitor set cell falls within the predetermined range.

Therefore, the worst active set cell and the monitor set cell can be replaced with each other at an early stage when the communication level of the monitor set cell falls within the predetermined range.

According to a mobile unit of the present invention, the mobile unit includes a controller for reporting, to a network host processor through a plurality of active set cells, the occurrence of an event related to cell replacement when the communication level of a monitor set cell becomes equal to or higher than the sum total of the communication level of the worst active set cell having the lowest communication level among the plurality of active set cells and a predetermined threshold previously determined, wherein the controller has: first setting means for defining a predetermined range with respect to the communication level of the best active set cell having the highest communication level among the plurality of active set cells; and second setting means for setting the predetermined threshold at a first value when the communication level of the monitor set cell does not fall within the predetermined range, and at a second value lower than the first value when the communication level of the monitor set cell falls within the predetermined range.

Therefore, the worst active set cell and the monitor set cell can be replaced with each other at an early stage when the communication level of the monitor set cell falls within the predetermined range.

According to a network host processor of the present invention, the network host processor includes: a first function of receiving a report on the occurrence of an event related to cell addition from a mobile unit through a plurality of active set cells when the communication level of a monitor set cell falls within a predetermined reporting range defined with respect to the communication level of a predetermined active set cell among the plurality of active set cells; and a second function of causing the mobile unit to replace the monitor set cell and the worst active set cell having the lowest communication level among the plurality of active set cells, with each other, when the communication level of the monitor set cell is higher than that of an arbitrary one of the plurality of active set cells.

Therefore, the worst active set cell and the monitor set cell can be replaced with each other at an early stage when the communication level of the monitor set cell falls within the predetermined reporting range.

Therefore, the worst active set cell and the monitor set cell can be replaced with each other at an early stage when the monitor set cell is the best cell.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a conceptual view showing message transmission between a mobile unit and a network related to the event 1C;

BEST MODE FOR CARRYING OUT THE INVENTION

First, a mobile communication system according to a prerequisite technique of the present invention will be discussed prior to discussing preferred embodiments of a mobile communication system according to the present invention.

Figure 1:
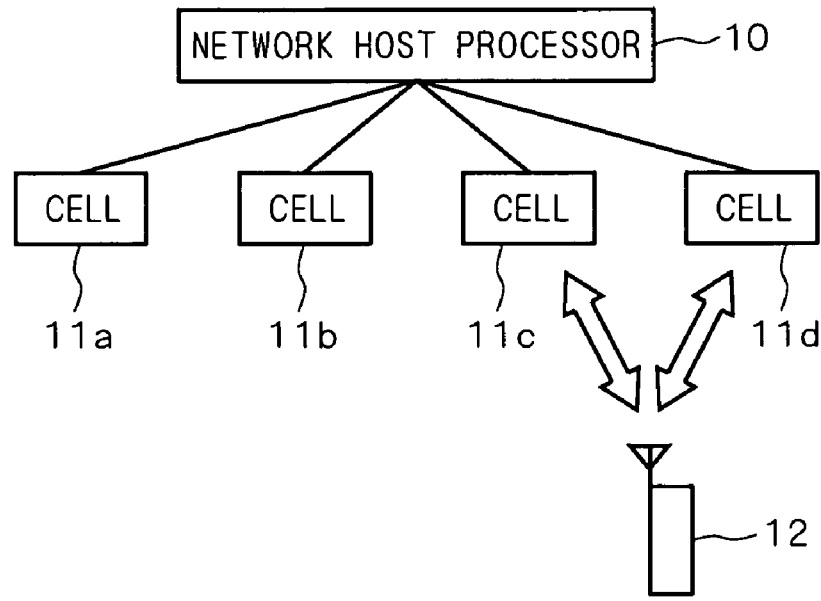
FIG. 1 is a block diagram showing the construction of a mobile communication system according to a prerequisite technique of the present invention.

FIG. 1 is a block diagram showing the construction of the mobile communication system according to the prerequisite technique of the present invention. The mobile communication system includes a network host processor 10, base stations (cells) 11a to 11d and a mobile unit 12, and operates with the W-CDMA system, for example. The network host processor 10 and cells 11a to 11d are collectively called a network. The network host processor 10 is formed by a radio network controller (RNC) and the like, and has control over operations of the network as a whole. The cells 11a to 11d exchange radio communication with the mobile unit 12. A user makes a call, data communication and the like through the mobile unit 12.

Figure 2:
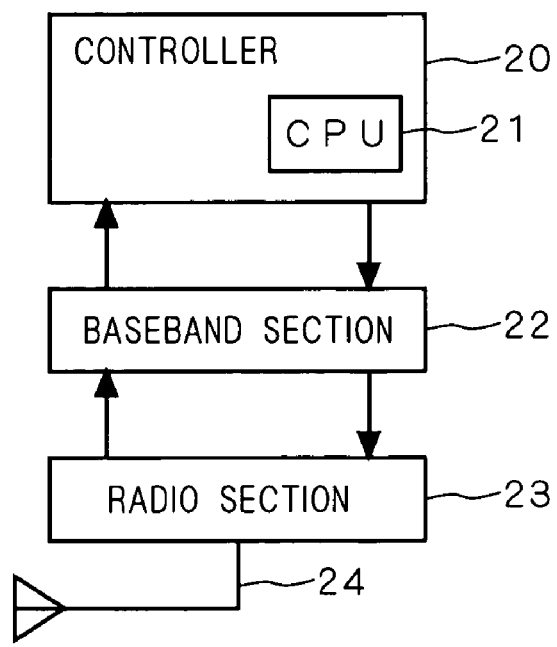
FIG. 2 is a block diagram showing the configuration of a mobile unit in the mobile communication system according to the prerequisite technique of the present invention.

FIG. 2 is a block diagram showing the configuration of the mobile unit 12. The mobile unit 12 includes a controller 20, a baseband section 22, a radio section 23 and an antenna section 24. The controller 20 is provided with a CPU 21, and the CPU 21 operates in accordance with predetermined control software. The baseband section 22 converts information transmitted between the mobile unit 12 and the network into a digital signal. The radio section 23 modulates the digital signal so that it can be sent by radio waves. The antenna section 24 serves as an inlet/outlet of radio waves.

The soft handover procedure defined by 3GPP is described in 3GPP specifications TS25.331 V3.11.0. Hereinbelow, the general outlines of the soft handover procedure will be discussed.

A mobile unit periodically measures the radio wave status (communication level) of a primary common pilot channel (PCPICH) of neighboring cells identified by a cell with which the mobile unit is communicating or in which the mobile unit is on standby. This operation is called a measurement operation. A communication line between a cell and a mobile unit is called an RL (radio link), and more specifically, the soft handover procedure contains addition, removal and replacement of RLs. A cell currently communicating with the mobile unit is called an active set cell, while a cell not communicating with the mobile unit but under the measurement operation is called a monitor set cell.

When the result of a periodic measurement operation shows that the communication level between the monitor set cell and mobile unit has increased or is likely to have increased, the mobile unit reports the occurrence of that fact (event) to a network host processor through active set cells. This event is called an event 1A. The network host processor having received the report on the event 1A performs a typical operation of causing the mobile unit to communicate with the monitor set cell. Throughout the present specification, this operation is referred to as an RL addition operation. With the RL addition operation, the monitor set cell becomes an active set cell.

When the result of a periodic measurement operation shows that the communication level between one of the plurality of active set cells and the mobile unit holding communication with a plurality of active set cells has been lowered, the mobile unit reports the occurrence of that fact (event) to the network host processor through the active set cells. This event is called an event 1B. The network host processor having received the report on the event 1B performs a typical operation of causing the mobile unit to interrupt communication with the active set cell lowered in communication level. Throughout the present specification, this operation is referred to as an RL removal operation. With the RL removal operation, the active set cell becomes a monitor set cell.

Figure 3:
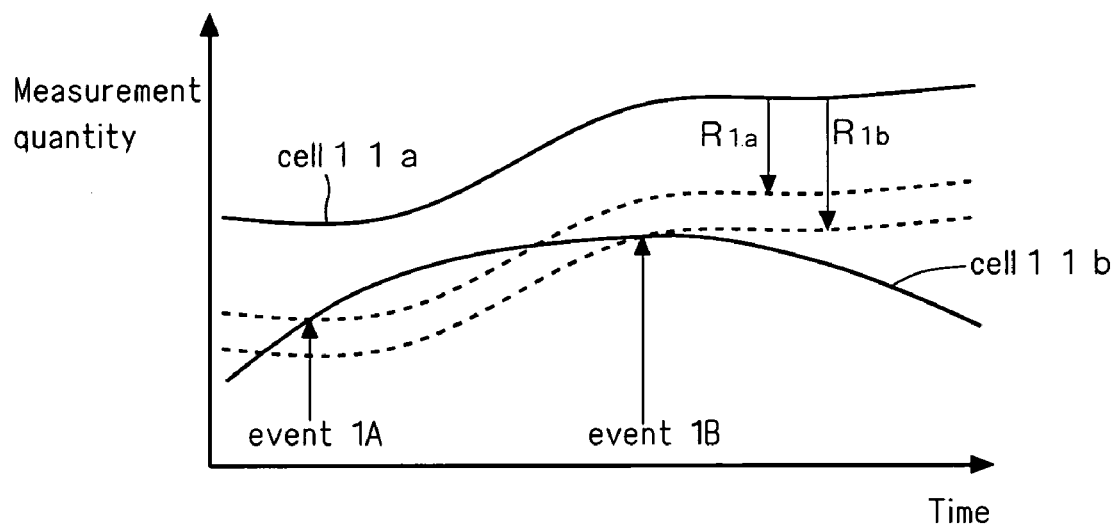
FIG. 3 is an explanatory view showing events 1A and 1B in the mobile communication system according to the prerequisite technique of the present invention.

FIG. 3 is an explanatory view showing the events 1A and 1B. Throughout the present specification, one of a plurality of active set cells having the highest communication level with the mobile unit is called the best active set cell. Referring to FIG. 3, in the case where the cell 11a is the only one active set cell (i.e., the cell 11a is the best active set cell), the event 1A occurs when the communication level between the cell 11b and mobile unit 12 is raised to enter a reporting range $R_{1a}$ relative to the event 1A. The reporting range $R_{1a}$ is defined with respect to the communication level of the best active set cell 11a.

In the case where the cells 11a and 11b are active set cells, the event 1B occurs when the communication level between the cell 11b and mobile unit 12 is lowered to fall outside a reporting range $R_{1b}$ relative to the event 1B. The reporting range $R_{1b}$ is defined with respect to the communication level of the best active set cell 11a.

The maximum number of active set cells with which a mobile unit can communicate simultaneously is called the maximum RL number. Throughout the present specification, one of a plurality of active set cells having the lowest communication level with the mobile unit is called the worst active set cell. When the result of a periodic measurement operation shows that the communication level between a monitor set cell and the mobile unit holding communication with the maximum RL number has or is likely to have become higher than that between the worst active set cell and the mobile unit, the mobile unit reports the occurrence of that fact (event) to the network host processor through active set cells. This event is called an event 1C. The network host processor having received the report on the event 1C performs a typical operation of causing the mobile unit to replace the worst active set cell and the monitor set cell with each other. Throughout the present specification, this operation is referred to as an RL replacement operation. With the RL replacement operation, the monitor set cell becomes an active set cell while the worst active set cell becomes a monitor set cell. The RL replacement operation is, as a result, equal to successively performed RL removal operation and RL addition operation.

To prevent the mobile unit from reporting the occurrence of the event 1C frequently reacting to weak flutters in communication level, a flutter-preventing threshold $H_{1c}$ is determined for the event 1C. Specifically, the event 1C does not occur unless the communication level between the worst active set cell and the mobile unit is equal to or higher than the sum total of the communication level between the worst active set cell and the mobile unit and the flutter-preventing threshold $H_{1c}$.

Similarly, a flutter-preventing threshold $H_{1a}$ is determined for the event 1A. The event 1A does not occur unless the communication level between the monitor set cell and the mobile unit exceeds the reporting range $R_{1a}$ by not less than the flutter-preventing threshold $H_{1a}$. Similarly, a flutter-preventing threshold $H_{1b}$ is determined for the event 1B. The event 1B does not occur unless the communication level between the worst active set cell and the mobile unit falls below the reporting range $R_{1b}$ by not less than the flutter-preventing threshold $H_{1b}$.

In the mobile communication system according to the prerequisite technique of the present invention, the flutter-preventing thresholds $H_{1a}$ to $H_{1c}$ are constant values instructed by the network as a broadcast channel or control message, and do not dynamically vary in accordance with the communication level or the like.

Figure 4:
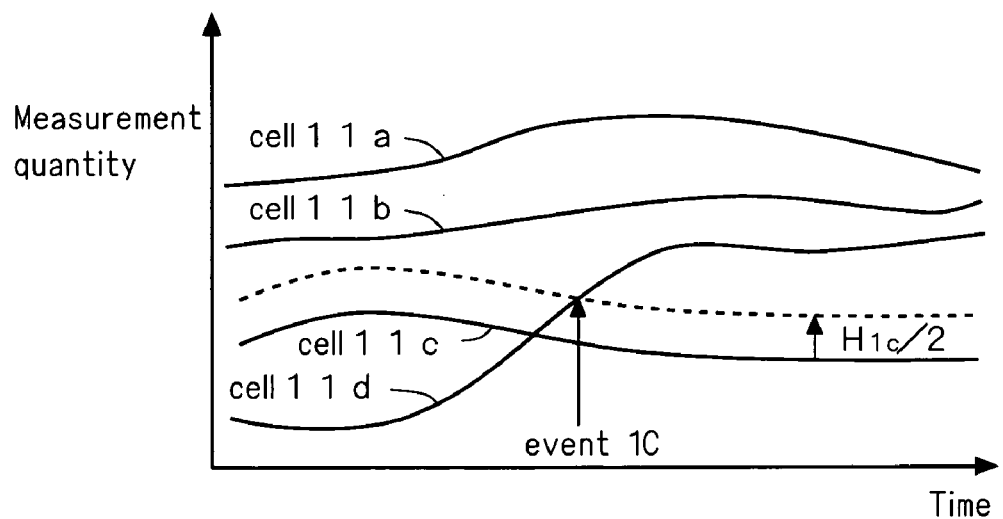
FIG. 4 is an explanatory view showing an event 1C in the mobile communication system according to the prerequisite technique of the present invention.

FIG. 4 is an explanatory view showing the event 1C. Here, the maximum RL number is 3 by way of example. In the case where the cells 11a to 11c are active set cells, the event 1C occurs when the communication level between the monitor set cell 11d and the mobile unit 12 is equal to or higher than the sum total of the communication level between the worst active set cell 11c and the mobile unit 12 and the flutter-preventing threshold $H_{1c}$. The reason why FIG. 4 depicts the value "$H_{1c}/2$" not "$H_{1c}$" is because $H_{1c}/2$ is defined in each of the positive direction and negative direction with respect to a reference value (communication level of cell 11c) so that flutters within the range of $H_{1c}$ are allowed as a whole.

FIG. 5 is a conceptual view showing message transmission between the mobile unit 12 and the network in the case of the event 1C. The mobile unit 12 having detected the occurrence of the event 1C sends a measurement report informing of the occurrence of the event 1C to the network. The network having received the measurement report sends an active set update which is an instruction of cell replacement to the mobile unit 12. In accordance with the active set update, the mobile unit 12 interrupts communication with the worst active set cell 11c while starting communicating with the monitor set cell 11d. That is, the cell replacement operation is carried out. Upon completion of this operation, the mobile unit 12 sends an active set update complete informing of the completion of the operation to the network.

Although there exist other events 1D, 1E, 1F and the like, detailed explanation thereof is omitted here.

As to which event is to be monitored and reported by the mobile unit, the network issues instructions to the mobile unit as a broadcast channel or control message. The mobile unit periodically performs a measurement operation to monitor an event as instructed, and makes a report to the network if the event occurs. The soft handover procedure is thereby started.

Generally, in the case where the mobile unit is in communication with the maximum RL number, the mobile unit is instructed by the network not to monitor or report the event 1A since no more active set cells can be added. More specifically, a deactivation threshold relative to the event 1A is included in the broadcast channel or control message, and the mobile unit automatically stops monitoring the event 1A at the time when the number of active set cells (RL number) reaches the deactivation threshold relative to the event 1A. The mobile unit starts monitoring the event 1A at the time when the RL number falls below the deactivation threshold relative to the event 1A.

In the case where the mobile unit is holding communication with less than the maximum RL number, the mobile unit is instructed by the network not to monitor or report the event 1C since cell replacement is not necessary to be performed. More specifically, an activation threshold relative to the event 1C is included in the broadcast channel or control message, and the mobile unit automatically starts monitoring the event 1C at the time when the RL number reaches the activation threshold relative to the event 1C. The mobile unit stops monitoring the event 1C at the time when the RL number falls below the activation threshold relative to the event 1C.

Judgment expressions for judging if the events 1A to 1C defined by 3GPP occur are shown below as expressions (1) to (3). The respective judgment expressions relative to the events 1A to 1C vary depending on whether the communication level of a cell is measured based on either Pathloss, Received Signal Code Power (RSCP), or a ratio between the whole received power and desired code power (Ec/No). The following expressions (1) to (3) are judgment expressions when making measurements based on RSCP.

$$10 \cdot \text{Log} M_{New} + CIO_{New} \geq W \cdot 10 \cdot \text{Log}\left(\sum_{i=1}^{NA} Mi\right) + \qquad (1)$$

$$(1 - W) \cdot 10 \cdot \text{Log} M_{Best} - (R_{1a} - H_{1a}/2)$$

-continued $$10 \cdot \log M_{Old} + CIO_{Old} \leq W \cdot 10 \cdot \log\left(\sum_{i=1}^{NA} Mi\right) + \quad (2)$$

$$(1-W) \cdot 10 \cdot \log M_{Best} - (R_{1b} + H_{1b}/2)$$

$$10 \cdot \log M_{New} + CIO_{New} \geq 10 \cdot \log M_{InAS} + CIO_{InAS} + H_{1c}/2 \quad (3)$$

$M_{New}$ is the measurement result of the cell entering the reporting range/not included in the active set.

$M_{Old}$ is the measurement result of the cell leaving the reporting range.

$CIO_{New}$ is the individual cell offset for the cell entering/leaving the reporting range/becoming better than the cell in the active set if an individual cell offset is stored for that cell. Otherwise it is equal to 0.

Mi is a measurement result of a cell not forbidden to affect reporting range in the active set.

NA is the number of cells not forbidden to affect reporting range in the current active set.

$M_{Best}$ is the measurement result of the cell not forbidden to affect reporting range in the active set with the highest measurement result, not taking into account any cell individual offset.

$M_{InAS}$ is the measurement result of the cell in the active set with the lowest measurement result.

W is a parameter sent from UTRAN to UE.

$R_{1a}$ is the reporting range constant.

$H_{1a}$ is the hysteresis parameter for the event 1a.

$R_{1b}$ is the reporting range constant.

$H_{1b}$ is the hysteresis parameter for the event 1b.

$CIO_{InAS}$ is the individual cell offset for the cell in the active set that is becoming worse than the new cell.

$H_{1c}$ is the hysteresis parameter for the event 1c.

If the measurement results are pathloss or CPICH-Ec/No then $M_{New}$, Mi and $M_{Best}$ are expressed as ratios.

If the measurement result is CPICH-RSCP then $M_{New}$, Mi and $M_{Best}$ are expressed in mW.

For sake of simplicity, FIG. 3 shows an example in the case where $W=H_{1a}=H_{1b}=CIO_{New}=0$, and FIG. 4 shows an example in the case where $CIO_{InAS}=0$.

Figure 6:
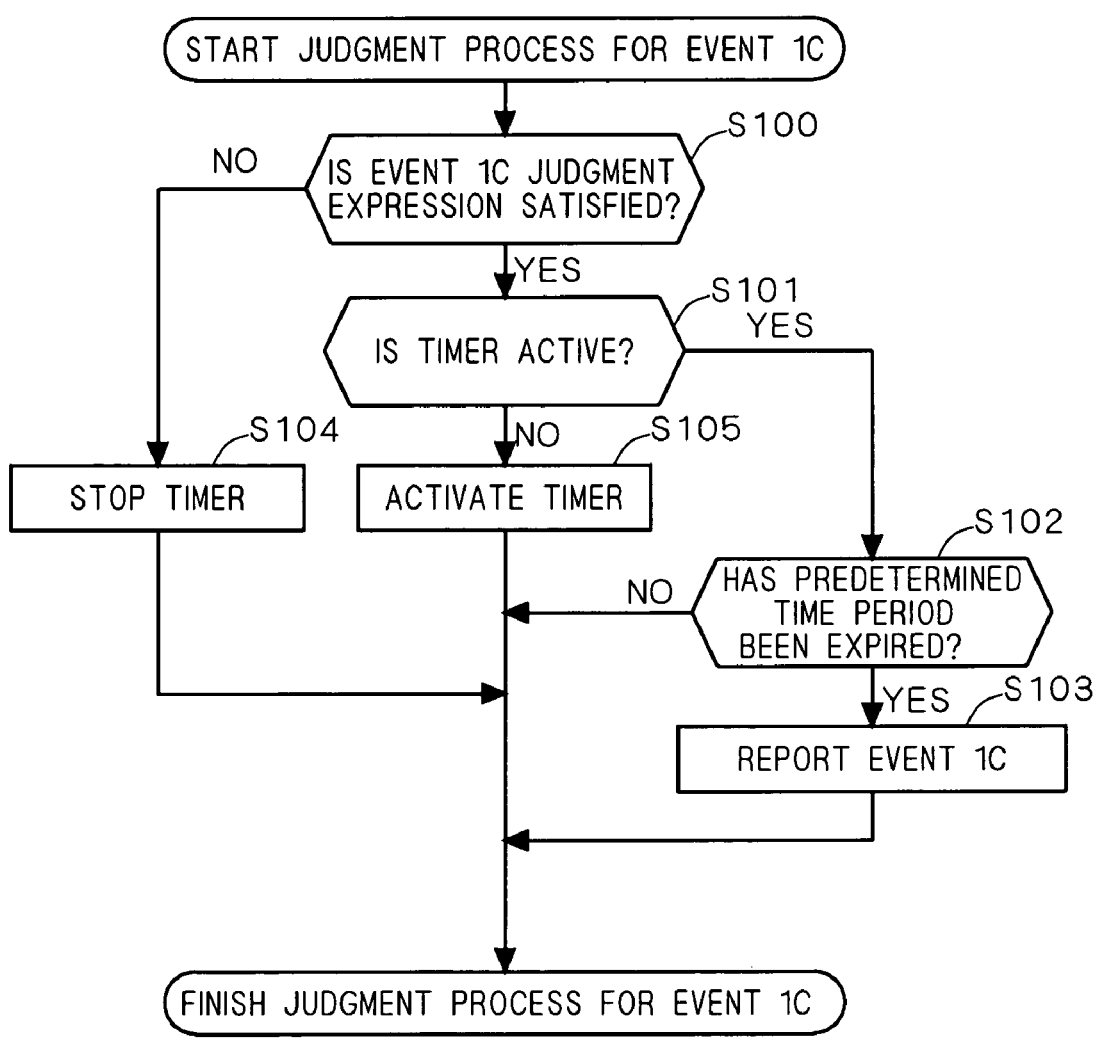
FIG. 6 is a flow chart showing operations of the mobile unit for judging the event 1C in the mobile communication system according to the prerequisite technique of the present invention.

FIG. 6 is a flow chart showing operations of the mobile unit for judging the event 1C. The mobile unit periodically performs the measurement operation as described above, and the judgment process shown in FIG. 6 is conducted each time the measurement operation is performed. Hereinbelow, the operations of the mobile unit 12 for judging the event 1C will be discussed with reference to FIGS. 1, 4 and 6.

First, in step S100, the mobile unit 12 judges whether or not the monitor set cell 11d satisfies the judgment expression relative to the event 1C given by the above expression (3). When the judgment result in step S100 is "YES", the process goes to step S101, where the mobile unit 12 judges whether or not a timer for judging whether or not a predetermined time period has passed is activated. The predetermined time period is previously determined as a time-to-trigger value (β).

When the judgment result in step S101 is "YES", the process goes to step S102, where the mobile unit 12 judges whether or not the predetermined time period has expired. When the judgment result in step S102 is "YES", i.e., when the judgment expression relative to the event 1C is kept satisfied over the predetermined time period or longer, the process goes to step S103, where the mobile unit 12 reports the occurrence of the event 1C to the network host processor 10. Thereafter, the judgment process for the event 1C is finished.

When the judgment result in step S100 is "NO", the process goes to step S104, where the mobile unit 12 stops the timer if activated. Thereafter, the judgment process for the event 1C is finished.

When the judgment result in step S101 is "NO", the process goes to step S105, where the mobile unit 12 activates the timer. Thereafter, the judgment process for the event 1C is finished.

When the judgment result in step S102 is "NO", the mobile unit 12 finishes the judgment process for the event 1C.

As described, the judgment process shown in FIG. 6 is conducted each time the measurement operation relative to the monitor set cell 11d is performed. The mobile unit 12 reports the occurrence of the event 1C to the network only in the case where the judgment expression relative to the event 1C is kept satisfied over the predetermined time period previously determined as a time-to-trigger value or longer.

Figure 7:
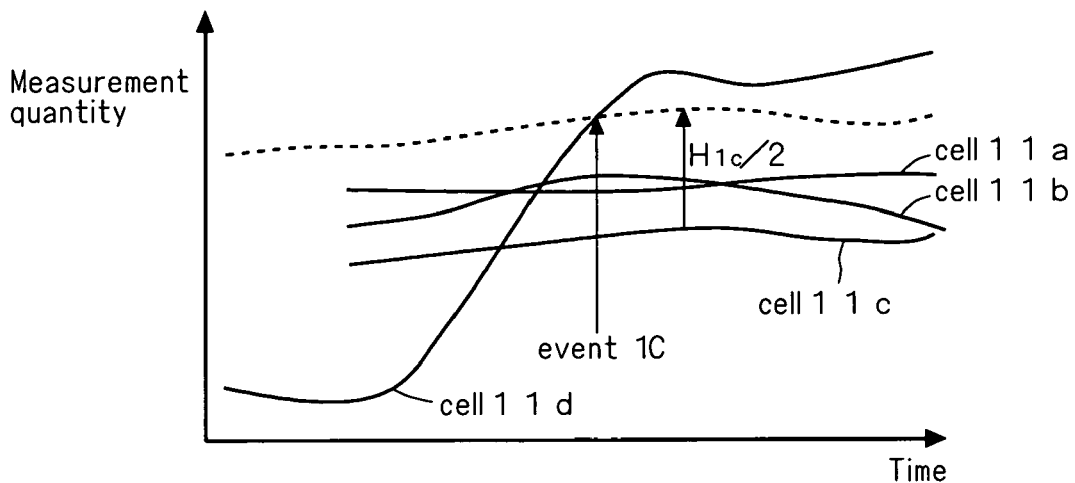
FIG. 7 is an explanatory view showing problems in the mobile communication system according to the prerequisite technique of the present invention.

FIG. 7 is an explanatory view showing problems in the mobile communication system according to the prerequisite technique of the present invention. It is ideally desirable that the mobile unit 12 report the occurrence of the event 1C to the network at the time when the communication level of the monitor set cell 11d exceeds that of the worst active set cell 11c, and a cell be replaced with another one by the network. However, since the flutter-preventing threshold $H_{1c}$ is determined, the event 1C occurs after the communication level of the monitor set cell 11d exceeds the communication levels of all the active set cells 11a to 11c in the example shown in FIG. 7. Therefore, radio waves of the monitor set cell 11d become interference waves (disturbance waves) with respect to the active set cells 11a to 11c. For sake of simplicity, FIG. 7 shows an example in the case where the time-to-trigger value is zero, however, if the time-to-trigger value is greater than zero, the occurrence of the event 1C is delayed further, and thus, it is assumed that communication may already have been disabled at the time of occurrence of the event 1C. Such problem is likely to occur in the case where the active set cells 11a to 11c are close to each other in communication level as shown in FIG. 7.

In a place flooded with buildings such as the center of a large city, the communication level between a cell and a mobile unit varies complicatedly. For instance, there may be a cell (monitor set cell) which is very close to the mobile unit but has a low communication level because of being shaded by a building, and is thus not an active set cell. In such a case, when a user having the mobile unit comes to a large intersection, the communication level of the monitor set cell may increase abruptly to become interference waves with respect to active set cells.

Further, a cell generally sends radio waves almost horizontally. Accordingly, in the case where a cell provided on top of a building is an active set cell, the communication level of the active set cell drops abruptly when a user having the mobile unit comes to directly below the building. Thus, the communication level of another cell (monitor set cell) provided in another place may relatively increase abruptly to become interference waves with respect to the active set cell.

In such a case, the above-described problems encountered in the mobile communication system according to the prerequisite technique of the present invention are likely to occur.

1. First Preferred Embodiment

In a mobile communication system according to a first preferred embodiment of the present invention, a predetermined range called an emergency range ER is defined with respect to the communication level of the best active set cell. Then, in judging the event 1C, the mobile unit sets a flutter-preventing threshold H relative to the event 1C at a first value ($H_{1c}$) for the case in which the communication level of a monitor set cell does not fall within the emergency range ER, and at a second value ($\alpha$) lower than the first value ($H_{1c}$) for the case in which the communication level of the monitor set cell falls within the emergency range ER.

Figure 8:
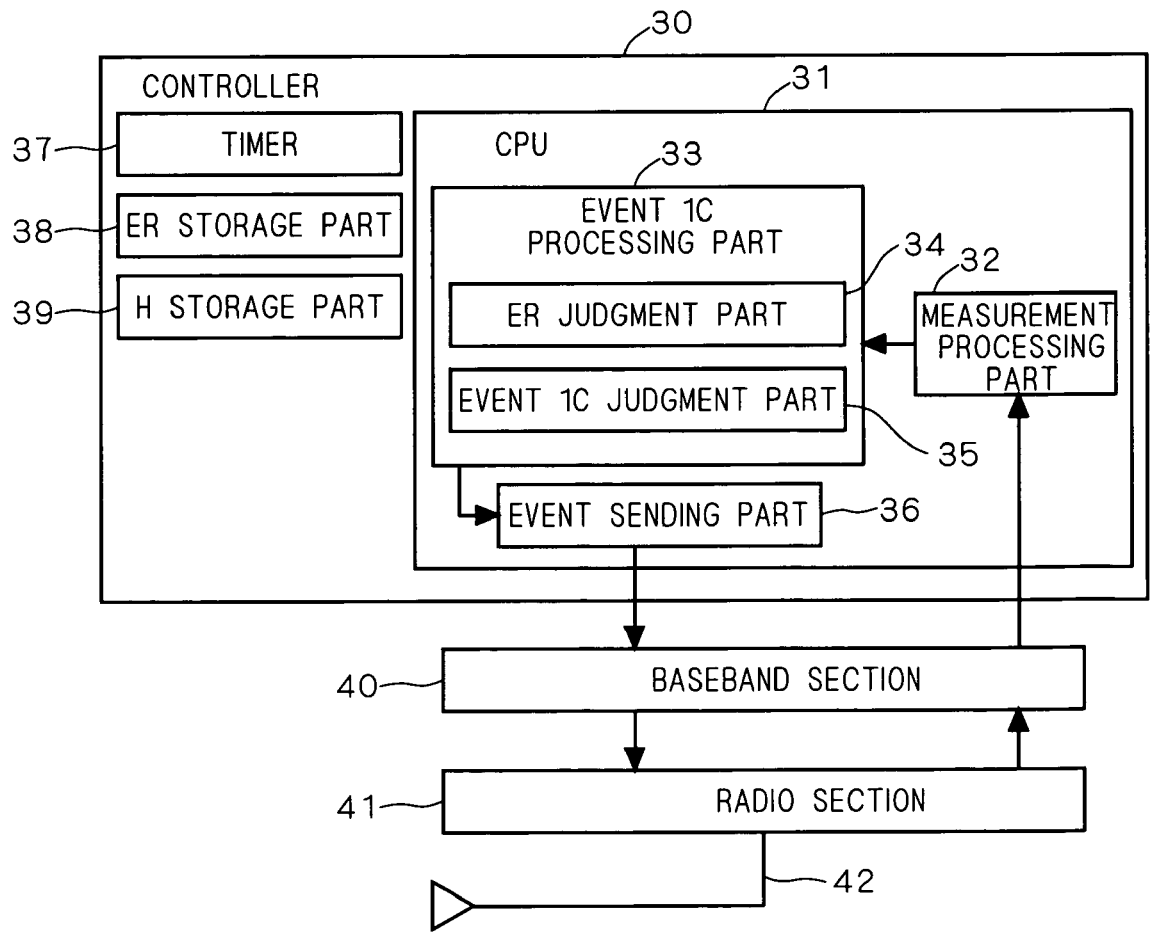
FIG. 8 is a block diagram showing the configuration of a mobile unit in a mobile communication system according to a first preferred embodiment of the present invention.

FIG. 8 is a block diagram showing the configuration of the mobile unit 12 in the mobile communication system according to the first preferred embodiment. The mobile unit 12 includes a controller 30, a baseband section 40, a radio section 41 and an antenna section 42. The controller 30 is provided with a CPU 31, and the CPU 31 operates in accordance with predetermined control software. The baseband section 40 converts information transmitted between the mobile unit 12 and the network into a digital signal. The radio section 41 modulates the digital signal so that it can be sent by radio waves. The antenna section 42 serves as an inlet/outlet of radio waves.

The controller 30 is further provided with a timer 37 for judging whether or not a predetermined time period previously determined as a time-to-trigger value ($\beta$) has passed, an ER storage part 38 for storing the value of the emergency range ER and an H storage part 39 for storing the flutter-preventing threshold H relative to the event 1C (i.e., $H_{1c}$ and $\alpha$). The ER storage part 38 and H storage part 39 are each formed by a semiconductor memory, for example. The CPU 31 is provided with an event 1C processing part 33, a measurement processing part 32 and an event sending part 36. The event 1C processing part 33 has an ER judgment part 34 and an event 1C judgment part 35.

The measurement processing part 32 calculates information such as an electric field strength and the quantity of interference based on data received through the antenna section 42, radio section 41 and baseband section 40. The event 1C processing part 33 is activated by the measurement processing part 32.

The ER judgment part 34 obtains the value of the emergency range ER from the ER storage part 38 to judge whether or not the communication level of a monitor set cell falls within the emergency range ER.

The value of the emergency range ER is a constant value previously stored in the ER storage part 38 or a variable determined by the ER judgment part 34 in accordance with the communication level of the best active set cell. As the communication level of the best active set cell decreases (i.e., as communication becomes more likely to be interrupted), the event 1C can be generated at an early stage by increasing the value of the emergency range ER. Alternatively, a parameter $ER_{1c}$ relative to the event 1C may be newly provided in the broadcast channel or control message sent from the network, and the value of the parameter $ER_{1c}$ may be adopted as the value of the emergency range ER. Further, the reporting range $R_{1a}$ relative to the event 1A may be used as the emergency range ER.

In the case where the communication level of a monitor set cell does not fall within the emergency range ER, the flutter-preventing threshold $H_{1c}$ relative to the event 1C is read from the H storage part 39. On the other hand, in the case where the communication level of the monitor set cell falls within the emergency range ER, the flutter-preventing threshold $\alpha$ ($<H_{1c}$) relative to the event 1C is read from the H storage part 39.

The value of the flutter-preventing threshold $\alpha$ is a constant value (including zero) previously stored in the H storage part 39 or a variable that varies in accordance with the communication level of the best active set cell. As the communication level of the best active set cell decreases, the event 1C can be generated at an early stage by decreasing the value of the flutter-preventing threshold $\alpha$. Alternatively, a parameter $H_{1c2}$ relative to the event 1C may be newly provided in the broadcast channel or control message sent from the network, and the value of the parameter $H_{1c2}$ may be adopted as the value of the flutter-preventing threshold $\alpha$.

The event 1C judgment part 35 is activated by the ER judgment part 34. The event 1C judgment part 35 performs a judgment process for the event 1C using the timer 37 and the flutter-preventing threshold H relative to the event 1C obtained from the H storage part 39. Further, the event 1C judgment part 35 activates the event sending part 36 when the event 1C occurs. The event sending part 36 sends information on the occurrence of the event 1C to the network through the baseband section 40, radio section 41 and antenna section 42.

Figure 9:
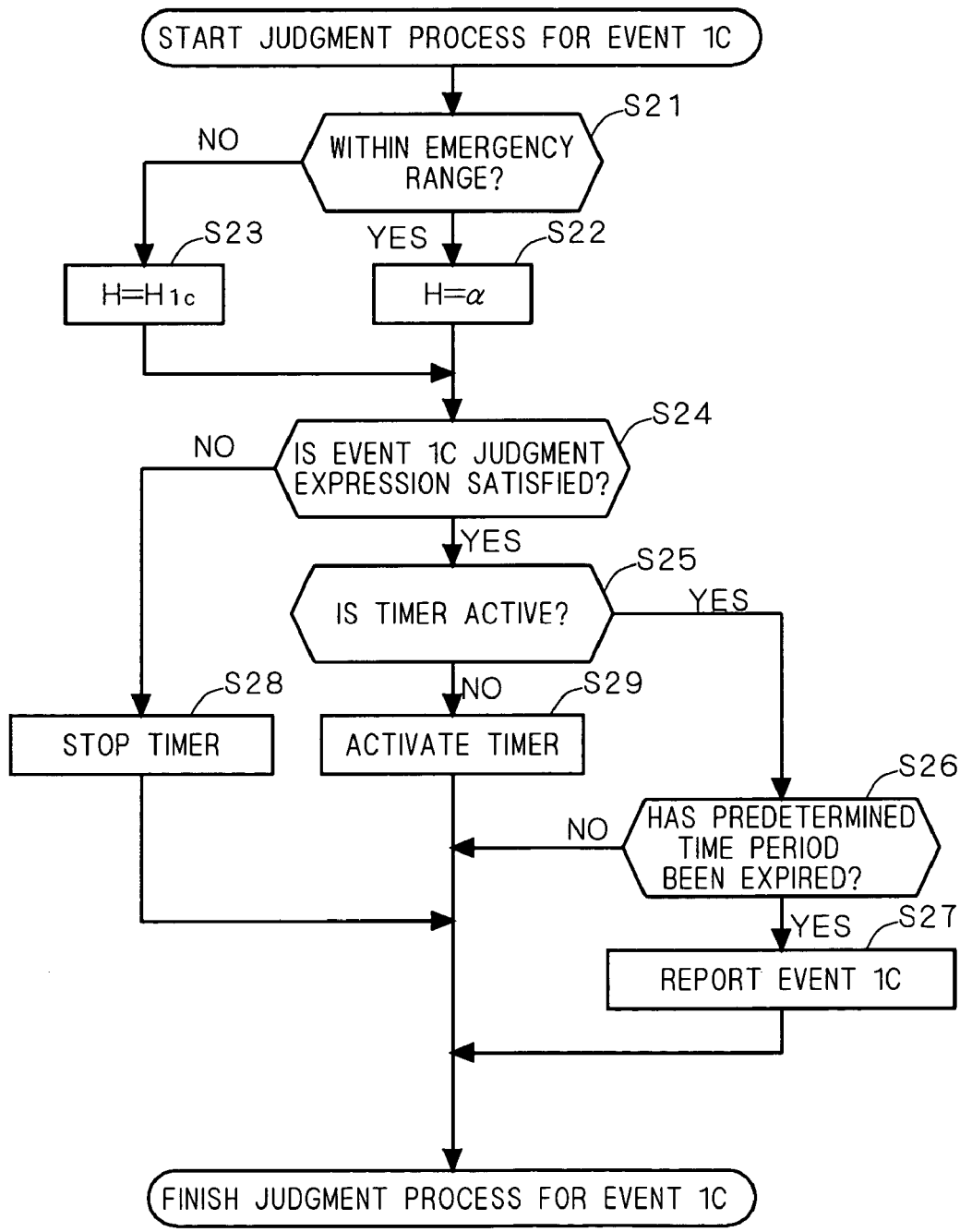
FIG. 9 is a flow chart showing operations of the mobile unit for judging the event 1C in the mobile communication system according to the first preferred embodiment.
Figure 10:
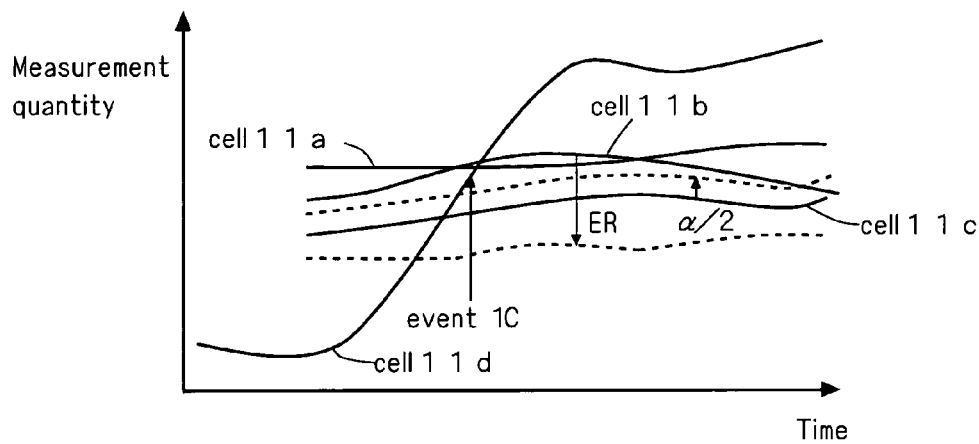
FIG. 10 is an explanatory view showing the event 1C in the mobile communication system according to the first preferred embodiment.

FIG. 9 is a flow chart showing operations of the mobile unit 12 for judging the event 1C in the mobile communication system according to the first preferred embodiment. FIG. 10 is an explanatory view showing the event 1C. In FIG. 10, it is assumed that the maximum RL number is 3, the cells 11a to 11c shown in FIG. 1 are active set cells, and the cell 11d is a monitor set cell. In the example shown in FIG. 10, the reporting range $R_{1a}$ relative to the event 1A is adopted as the emergency range ER. The mobile unit 12 periodically performs the measurement operation as described above, and a judgment process shown in FIG. 9 is conducted each time the measurement operation is performed. Hereinbelow, the operations of the mobile unit 12 for judging the event 1C will be discussed with reference to FIGS. 1, 9 and 10.

First, in step S21, the ER judgment part 34 judges whether or not the communication level of the monitor set cell 11d falls within the emergency range ER. When the judgment result in step S21 is "YES", i.e., when the communication level of the monitor set cell 11d falls within the emergency range ER, the flutter-preventing threshold a relative to the event 1C is determined in step S22. In other words, "$H_{1c}$" is changed to "$\alpha$" in the above-mentioned expression (3). In the example shown in FIG. 10, the flutter-preventing threshold $\alpha$ is determined since the communication level of the monitor set cell 11d falls within the emergency range ER. On the other hand, when the judgment result in step S21 is "NO", i.e., when the communication level of the monitor set cell 11d does not fall within the emergency range ER, the flutter-preventing threshold $H_{1c}$ relative to the event 1C is determined in step S23.

Next, in step S24, the event 1C judgment part 35 judges whether or not the monitor set cell 11d satisfies the judgment expression relative to the event 1C. When the judgment result in step S24 is "YES", the process goes to step S25, where the event 1C processing part 33 judges whether or not the timer 37 for judging whether or not a predetermined time period has passed is activated. This predetermined time period is previously determined as a time-to-trigger value ($\beta$).

When the judgment result in step S25 is "YES", the process goes to step S26, where the event 1C processing part 33 judges whether or not the predetermined time period has expired. When the judgment result in step S26 is "YES", i.e., when the judgment expression relative to the event 1C is kept satisfied over the predetermined time period or longer, the process goes to step S27, where the event sending part 36 reports the occurrence of the event 1C to the network host processor 10 through the active set cells 11a to 11c. Thereafter, the judgment process for the event 1C is finished.

When the judgment result in step S24 is "NO", the process goes to step S28, where the event 1C processing part 33 stops the timer 37 if activated. Thereafter, the judgment process for the event 1C is finished.

When the judgment result in step S25 is "NO", the process goes to step S29, where the event 1C processing part 33 activates the timer 37. Thereafter, the judgment process for the event 1C is finished.

When the judgment result in step S26 is "NO", the event 1C processing part 33 finishes the judgment process for the event 1C.

As described, the judgment process shown in FIG. 9 is conducted each time the measurement operation relative to the monitor set cell 11d is performed. The mobile unit 12 reports the occurrence of the event 1C to the network only in the case where the judgment expression relative to the event 1C is kept satisfied over the predetermined time period previously determined as a time-to-trigger value or longer.

With the above-described mobile communication system according to the first preferred embodiment, in judging the event 1C, the mobile unit 12 sets the flutter-preventing threshold H relative to the event 1C at the second value ($\alpha$) lower than the first value ($H_{1c}$) in the case where the communication level of a monitor set cell falls within the emergency range ER. Therefore, the occurrence of the event 1C can be reported at an earlier stage than in the mobile communication system according to the prerequisite technique of the present invention, even in the case where the active set cells 11a to 11c are close to each other in communication level. Therefore, cell replacement is more likely to be carried out before radio waves of the monitor set cell 11d become fatal interference waves for the active set cells 11a to 11c. This can solve the above-mentioned problems encountered in the mobile communication system according to the prerequisite technique of the present invention.

Further, adopting a variable that varies in accordance with the communication level of the best active set cell 11b as the flutter-preventing threshold $\alpha$, the above effects achieved by the mobile communication system according to the first preferred embodiment become more apparent.

2. Second Preferred Embodiment

In a mobile communication system according to a second preferred embodiment of the present invention, the mobile unit sets a time-to-trigger value at a first value ($\beta$) in the case where the communication level of a monitor set cell does not fall within the emergency range ER, and at a second value lower than the first value in the case where the communication level of the monitor set cell falls within the emergency range ER.

Figure 11:
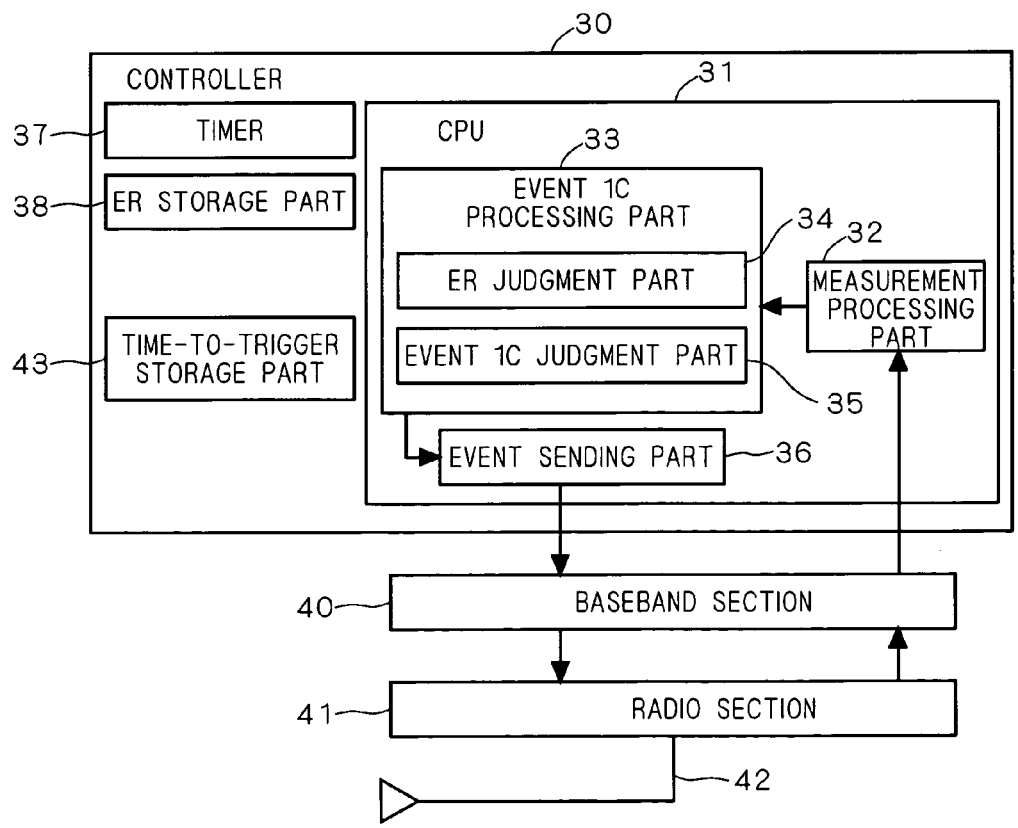
FIG. 11 is a block diagram showing the configuration of the mobile unit in a mobile communication system according to a second preferred embodiment of the present invention.

FIG. 11 is a block diagram showing the configuration of the mobile unit 12 in a mobile communication system according to the second preferred embodiment. The controller 30 is provided with the timer 37 for judging whether or not a time period determined as a time-to-trigger value has expired and a time-to-trigger storage part 43 for storing the time-to-trigger value. The time-to-trigger storage part 43 is formed by a semiconductor memory, for example.

The second time-to-trigger value is a constant value (including zero) previously stored in the time-to-trigger storage part 43 or a variable that varies in accordance with the communication level of the best active set cell. As the communication level of the best active set cell decreases, the event 1C can be generated at an early stage by decreasing the second time-to-trigger value. Alternatively, a parameter time-to-trigger$_2$ relative to the event 1C may be newly provided in the broadcast channel or control message sent from the network, and the value of the parameter time-to-trigger$_2$ may be adopted as the second time-to-trigger value.

Figure 12:
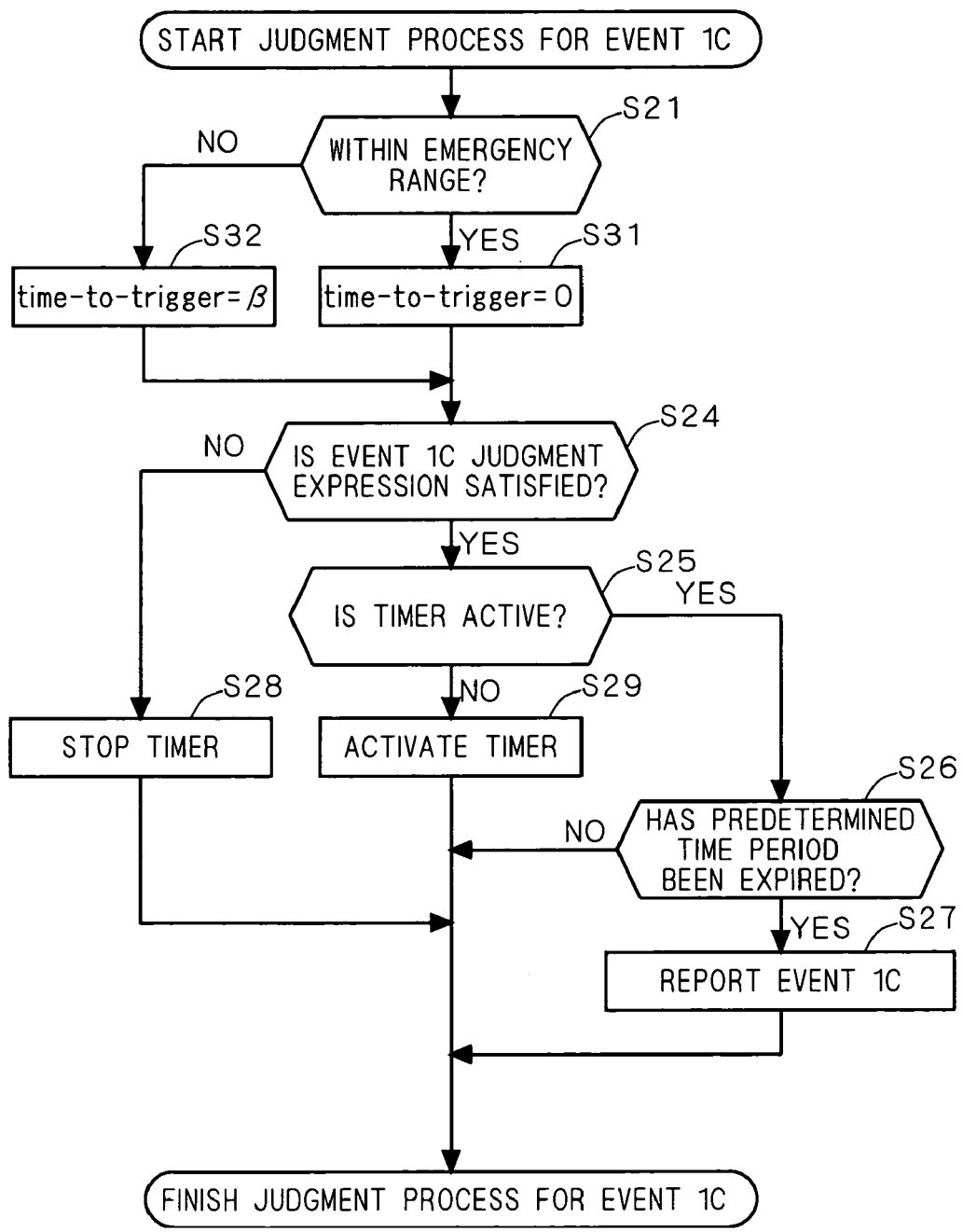
FIG. 12 is a flow chart showing operations of the mobile unit for judging the event 1C in the mobile communication system according to the second preferred embodiment.
Figure 13:
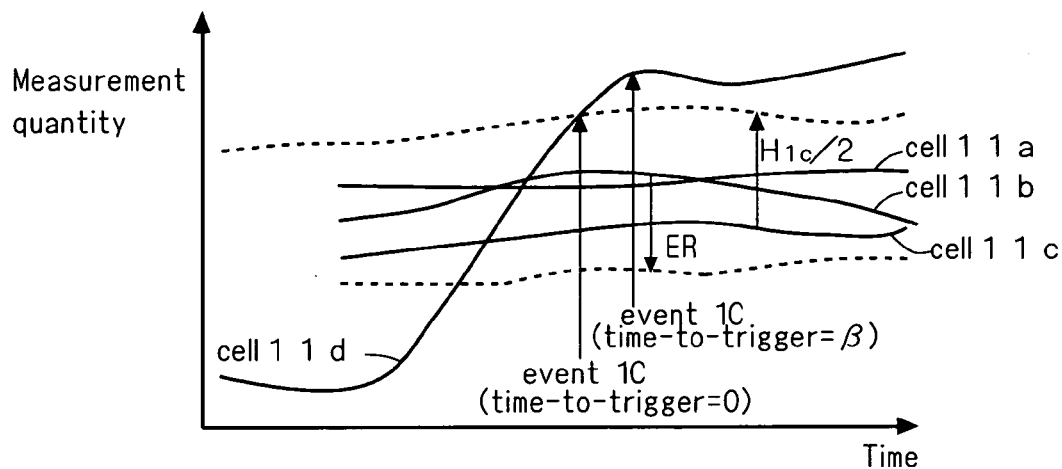
FIG. 13 is an explanatory view showing the event 1C in the mobile communication system according to the second preferred embodiment.

FIG. 12 is a flow chart showing operations of the mobile unit 12 for judging the event 1C in the mobile communication system according to the second preferred embodiment. FIG. 13 is an explanatory view showing the event 1C. In FIG. 13, it is assumed that the maximum RL number is 3, the cells 11a to 11c shown in FIG. 1 are active set cells, the cell 11d is a monitor set cell, and the second time-to-trigger value is zero. In the example shown in FIG. 13, the reporting range $R_{1a}$ relative to the event 1A is adopted as the emergency range ER. The mobile unit 12 periodically performs the measurement operation as described above, and a judgment process shown in FIG. 12 is conducted each time the measurement operation is performed. Hereinbelow, operations of the mobile unit 12 for judging the event 1C will be discussed with reference to FIGS. 1, 12 and 13.

First, in step S21, the ER judgment part 34 judges whether or not the communication level of the monitor set cell 11d falls within the emergency range ER. When the judgment result in step S21 is "YES", the time-to-trigger value is set at the second value (zero) in step S31. In the example shown in FIG. 13, the time-to-trigger value is set at the second value (zero), since the communication level of the monitor set cell 11d falls within the emergency range ER. As a result, the event 1C occurs just after the communication level of the monitor set cell 11d become equal to or higher than the sum total of the communication level of the worst active set cell 11c and the flutter-preventing threshold $H_{1c}$ (strictly saying, $H_{1c}/2$). On the other hand, when the judgment result in step S21 is "NO", the time-to-trigger value is set at the first value ($\beta$) in step S32.

Next, in step S24, the event 1C judgment part 35 judges whether or not the monitor set cell 11d satisfies the judgment expression relative to the event 1C. When the judgment result in step S24 is "YES", the process goes to step S25, where the event 1C processing part 33 judges whether or not the timer 37 for judging whether or not a predetermined time period has passed is activated. In the example shown in FIG. 13, the predetermined time period is determined as the second time-to-trigger value (zero).

When the judgment result in step S25 is "YES", the process goes to step S26, where the event 1C processing part 33 judges whether or not the predetermined time period has expired. When the judgment result in step S26 is "YES", the process goes to step S27, where the event sending part 36 reports the occurrence of the event 1C to the network host processor 10 through the active set cells 11a to 11c. Thereafter, the judgment process for the event 1C is finished.

The process to be followed when the judgment result in each of steps S24 to S26 is "NO" is similar to that described in the first preferred embodiment, explanation of which is thus omitted here.

With the above-described mobile communication system according to the second preferred embodiment, in judging the event 1C, the mobile unit 12 sets the time-to-trigger value at the second value lower than the first value ($\beta$) in the case where the communication level of a monitor set cell falls within the emergency range ER. Therefore, the occurrence of the event 1C can be reported at an earlier stage than in the mobile communication system according to the prerequisite technique of the present invention, even in the case where the active set cells 11a to 11c are close to each other in communication level. Therefore, cell replacement is more likely to be carried out before radio waves of the monitor set cell 11d become fatal interference waves for the active set cells 11a to 11c. This can solve the above-mentioned problems encountered in the mobile communication system according to the prerequisite technique of the present invention.

Further, adopting a variable that varies in accordance with the communication level of the best active set cell 11b as the second time-to-trigger value, the above effects achieved by the mobile communication system according to the second preferred embodiment become more apparent.

Figure 14:
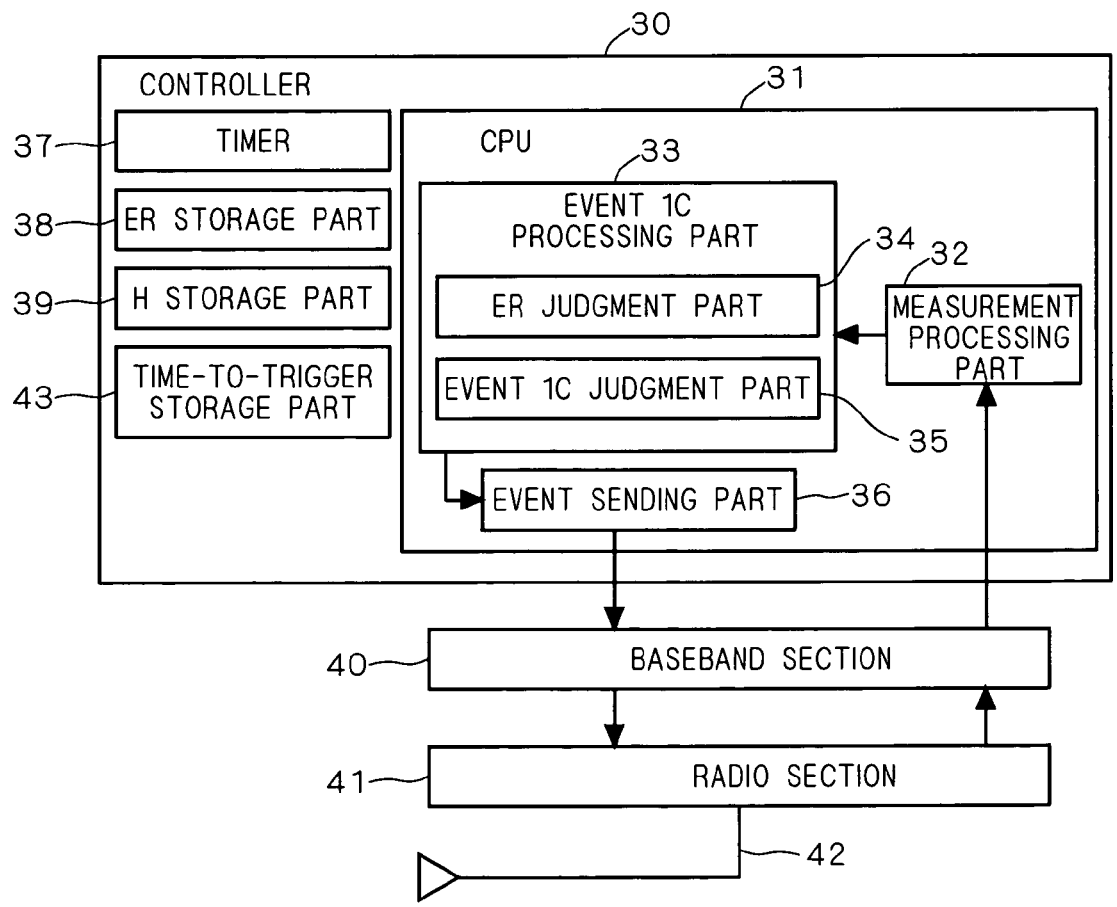
FIG. 14 is a block diagram showing the configuration of a mobile unit in a mobile communication system according to a variant of the second preferred embodiment.

FIG. 14 is a block diagram showing the configuration of the mobile unit 12 in a mobile communication system according to a variant of the second preferred embodiment. The controller 30 is provided with the H storage part 39 and time-to-trigger storage part 43. In this way, the invention of the first preferred embodiment and that of the second preferred embodiment may be combined together.

3. Third Preferred Embodiment

The mobile communication systems according to the above-described first and second preferred embodiments both achieve cell replacement at an early stage mainly with the operations of the mobile unit 12. In contrast, the mobile communication system according to the third preferred embodiment of the present invention achieves cell replacement at an early stage mainly with the operations of the network. In the mobile communication system according to the third preferred embodiment, the mobile unit is controlled by a broadcast channel or control message from the network to monitor and report the event 1A even when holding communication with the maximum RL number. Then, the network having received the report on the event 1A from the mobile unit in communication with the maximum RL number causes the mobile unit to replace a monitor set cell and the worst active set cell with each other if the communication level of the monitor set cell is higher than that of the worst active set cell.

Figure 15:
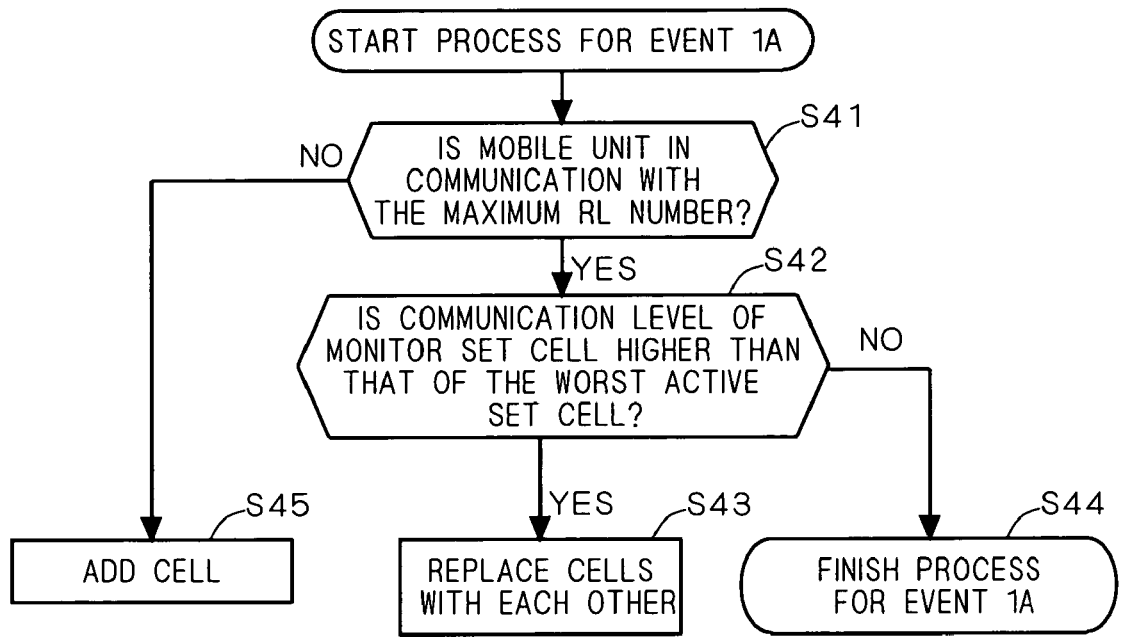
FIG. 15 is a flow chart showing operations of a network host processor having received a report on an event 1A from a mobile unit in a mobile communication system according to a third preferred embodiment of the present invention.
Figure 16:
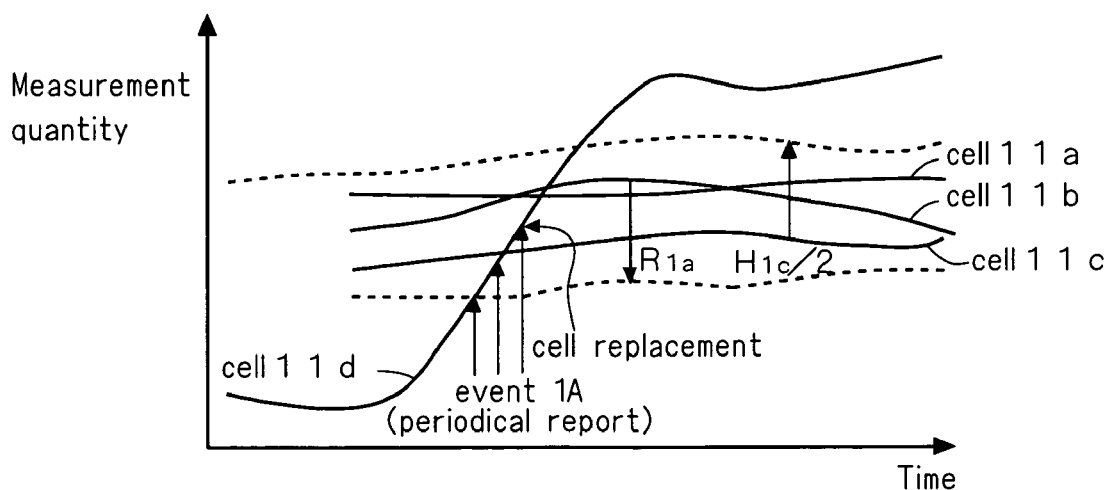
FIG. 16 is an explanatory view showing the event 1A in the mobile communication system according to the third preferred embodiment.

FIG. 15 is a flow chart showing operations of the network host processor 10 having received the report on the event 1A from the mobile unit 12 in the mobile communication system according to the third preferred embodiment. FIG. 16 is an explanatory view showing the event 1A. In FIG. 16, it is assumed that the maximum RL number is 3, the cells 11a to 11c shown in FIG. 1 are active set cells, and the cell 11d is a monitor set cell. The mobile unit 12 periodically performs the measurement operation, and reports the occurrence of the event 1A to the network host processor 10 through the active set cells 11a to 11c in the case where the communication level of the monitor set cell 11d falls within the reporting range $R_{1a}$ relative to the event 1A. Hereinbelow, the operations of the network host processor 10 having received the report on the event 1A will be discussed with reference to FIGS. 1, 15 and 16.

First, in step S41, the network host processor 10 having received the report on the event 1A judges whether or not the mobile unit 12 is in communication with the maximum RL number. When the judgment result in step S41 is "NO", the process goes to step S45, where the network host processor 10 performs a normal operation (RL addition operation). That is, the monitor set cell 11d is added as an active set cell.

On the other hand, when the judgment result in step S41 is "YES", the process goes to step S42, where the network host processor 10 judges whether or not the communication level of the monitor set cell 11d is higher than that of the worst active set cell 11c. However, comparison may be made with other active set cells 11a and 11b, instead of the worst active set cell 11c. Further, the flutter-preventing threshold $H_{1a}$ may be determined to judge whether or not the communication level of the monitor set cell 11d exceeds the reporting range $R_{1a}$ by not less than the flutter-preventing threshold $H_{1a}$.

When the judgment result in step S42 is "NO", the process goes to step S44, where the network host processor 10 finishes the process for the event 1A.

On the other hand, when the judgment result in step S42 is "YES", the process goes to step S43, where the network host processor 10 causes the mobile unit 12 to replace the monitor set cell 11d and the worst active set cell 11c with each other without waiting for a report on the event 1C from the mobile unit 12.

Referring to FIG. 16, the mobile unit 12 periodically reports the occurrence of the event 1A to the network host processor 10 since the communication level of the monitor set cell 11d enters the reporting range $R_{1a}$. At the third report, the communication level of the monitor set cell 11d is higher than that of the worst active set cell 11c. Therefore, the network host processor 10 detects this, and carries out cell replacement. After the cell replacement, the cells 11a, 11b and 11d are active set cells, and normal communication takes place.

With the above-described mobile communication system according to the third preferred embodiment, the network host processor 10 having received the report on the event 1A from the mobile unit 12 in communication with the maximum RL number causes the mobile unit 12 to replace the monitor set cell 11d and the worst active set cell 11c with each other if the communication level of the monitor set cell 11d is higher than that of the worst active set cell 11c. Therefore, cell replacement is more likely to be carried out before radio waves of the monitor set cell 11d become fatal interference waves for the active set cells 11a to 11c. This can solve the above-mentioned problems encountered in the mobile communication system according to the prerequisite technique of the present invention.

Further, determining the reporting range $R_{1a}$ for the best active set cell can avoid an increase in the number of messages transferred between the mobile unit 12 and the network.

4. Fourth Preferred Embodiment

The mobile communication systems according to the above-described first and second preferred embodiments both achieve cell replacement at an early stage mainly with the operations of the mobile unit 12. In contrast, the mobile communication system according to the fourth preferred embodiment achieves cell replacement at an early stage mainly with the operations of the network. In the case where a cell having the highest communication level among a plurality of cells (referred to as the best cell in the present specification) is changed, the mobile unit reports the occurrence of the event 1D to the network. The network having received the report on the event 1D from the mobile unit causes the mobile unit to replace a monitor set cell and the worst active set cell with each other in the case where the best cell as changed is the monitor set cell.

Figure 17:
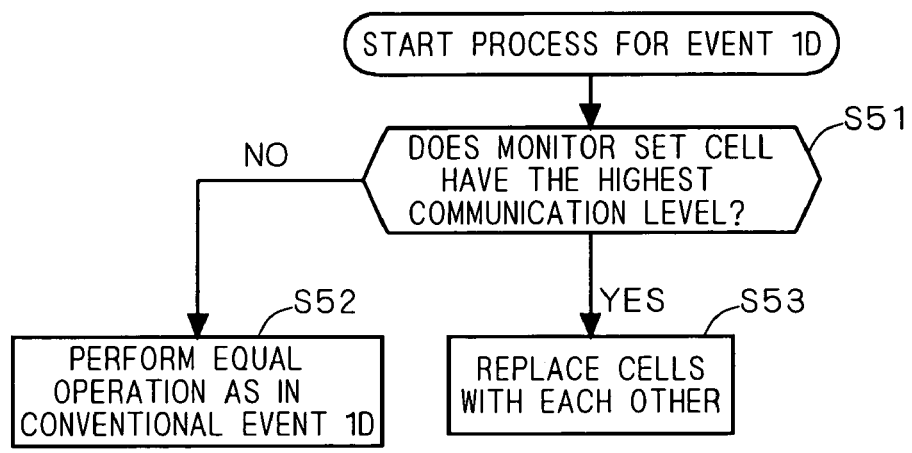
FIG. 17 is a flow chart showing operations of a network host processor having received a report on an event 1D from a mobile unit in a mobile communication system according to a fourth preferred embodiment of the present invention.
Figure 18:
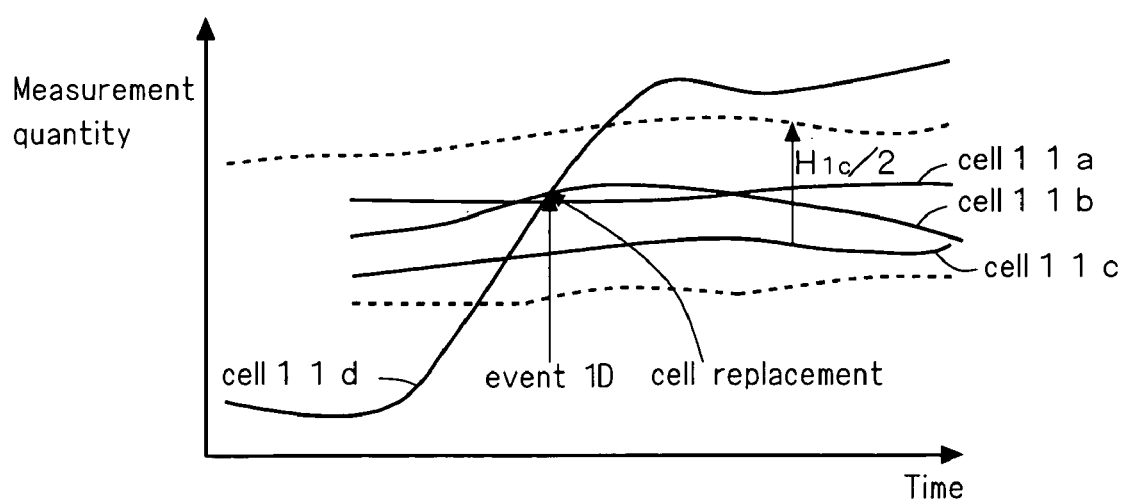
FIG. 18 is an explanatory view showing the event 1D in the mobile communication system according to the fourth preferred embodiment.

FIG. 17 is a flow chart showing operations of the network host processor 10 having received a report on the event 1D from the mobile unit 12 in the mobile communication system according to the fourth preferred embodiment of the invention. FIG. 18 is an explanatory view showing the event 1D. In FIG. 18, it is assumed that the maximum RL number is 3, the cells 11a to 11c shown in FIG. 1 are active set cells, and the cell 11d is a monitor set cell. The mobile unit 12 periodically performs the measurement operation, and reports the occurrence of the event 1D to the network host processor 10 through the active set cells 11a to 11c in the case where the best cell having the highest communication level among the plurality of cells 11a to 11d is changed. Hereinbelow, the operations of the network host processor 10 having received the report on the event 1D will be discussed with reference to FIGS. 1, 17 and 18.

First in step S51, the network host processor 10 having received the report on the event 1D judges whether or not the cell having the highest communication level is the monitor set cell 11d. When the judgment result in step S51 is "NO", the process goes to step S52, where the network host processor 10 performs an equal operation as in the case of the conventional event 1D.

On the other hand, when the judgment result in step S51 is "YES", the process goes to step S53, where the network host processor 10 causes the mobile unit 12 to replace the monitor set cell 11d and the worst active set cell 11c with each other without waiting for the report on the event 1C from the mobile unit 12.

Referring to FIG. 18, the mobile unit 12 reports the occurrence of the event 1D to the network host processor 10 since the best cell is changed from the cell 11b to cell 11d. Since the best cell as changed is the monitor set cell 11d, the network host processor 10 carries out cell replacement. After the cell replacement, the cells 11a, 11b and 11d are active set cells, and normal communication takes place.

With the mobile communication system according to the fourth preferred embodiment, the network host processor 10 having received the report on the event 1D from the mobile unit 12 causes the mobile unit 12 to replace the monitor set cell 11d and the worst active set cell 11c with each other in the case where the best cell as changed is the monitor set cell 11d. Therefore, cell replacement is more likely to be carried out before radio waves of the monitor set cell 11d become fatal interference waves for the active set cells 11a to 11c. This can solve the above-mentioned problems encountered in the mobile communication system according to the prerequisite technique of the present invention.

While the invention has been shown and described in detail, the foregoing description is in all aspects illustrative and not restrictive. It is therefore understood that numerous modifications and variations can be devised without departing from the scope of the invention.

The invention claimed is:

1. A mobile communication system comprising:
a network host processor;
a plurality of cells; and
a mobile unit, wherein
said plurality of cells include a monitor set cell and a plurality of active set cells,
said mobile unit includes a controller for reporting, to said network host processor through said plurality of active set cells, occurrence of an event related to cell replacement when the communication level of said monitor set cell becomes equal to or higher than the sum total of the communication level of the worst active set cell having the lowest communication level among said plurality of active set cells and a predetermined threshold previously determined, and
said controller includes:
first setting means for defining a predetermined range with respect to the communication level of the best active set cell having the highest communication level among said plurality of active set cells; and
second setting means for setting said predetermined threshold at a first value when the communication level of said monitor set cell does not fall within said predetermined range, and at a second value lower than said first value when the communication level of said monitor set cell falls within said predetermined range.

2. The mobile communication system according to claim 1, wherein
said event is an event 1C in the communication system defined by 3GPP (3rd Generation Partnership Project).

3. The mobile communication system according to claim 1, wherein
said second value is variable in accordance with the communication level of said best active set cell.

4. A mobile unit comprising:
a controller for reporting, to a network host processor through a plurality of active set cells, occurrence of an event related to cell replacement when the communication level of a monitor set cell becomes equal to or higher than the sum total of the communication level of the worst active set cell having the lowest communication level among said plurality of active set cells and a predetermined threshold previously determined, wherein
said controller includes:
first setting means for defining a predetermined range with respect to the communication level of the best active set cell having the highest communication level among said plurality of active set cells; and
second setting means for setting said predetermined threshold at a first value when the communication level of said monitor set cell does not fall within said predetermined range, and at a second value lower than said first value when the communication level of said monitor set cell falls within said predetermined range.

5. The mobile unit according to claim 4, wherein
said event is an event 1C in the communication system defined by 3GPP (3rd Generation Partnership Project).

6. The mobile unit according to claim 4, wherein
said second value is variable in accordance with the communication level of said best active set cell.

* * * * *